J. H. HERMANCE.

Assignor to R. S. & R. L. GREENLEE.

FEED MECHANISM FOR CIRCULAR SAWING MACHINES.

No. 10,467. Reissued Apr. 8, 1884.

Attest:
Charles H. Baker
J. R. Sitter

J. H. Hermance,
Inventor.

By C. A. Snow & Co
Atty's.

N. PETERS, Photo-Lithographer, Washington, D. C.

UNITED STATES PATENT OFFICE.

JOSEPH H. HERMANCE, OF TOLEDO, OHIO, ASSIGNOR TO R. S. & R. L. GREENLEE, OF CHICAGO, ILLINOIS.

FEED MECHANISM FOR CIRCULAR SAWING MACHINES.

SPECIFICATION forming part of Reissued Letters Patent No. 10,467, dated April 8, 1884.

Original No. 239,497, dated March 29, 1881. Application for reissue filed April 4, 1883.

*To all whom it may concern:*

Be it known that I, JOSEPH H. HERMANCE, of Toledo, in the county of Lucas and State of Ohio, have invented certain new and useful Improvements in Feeding Devices for Circular Sawing Machines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

This invention relates to feed mechanism for circular and other saws; and it consists in certain improvements in the construction of the same, which will be hereinafter fully described, and particularly pointed out in the claims.

Figure 1:
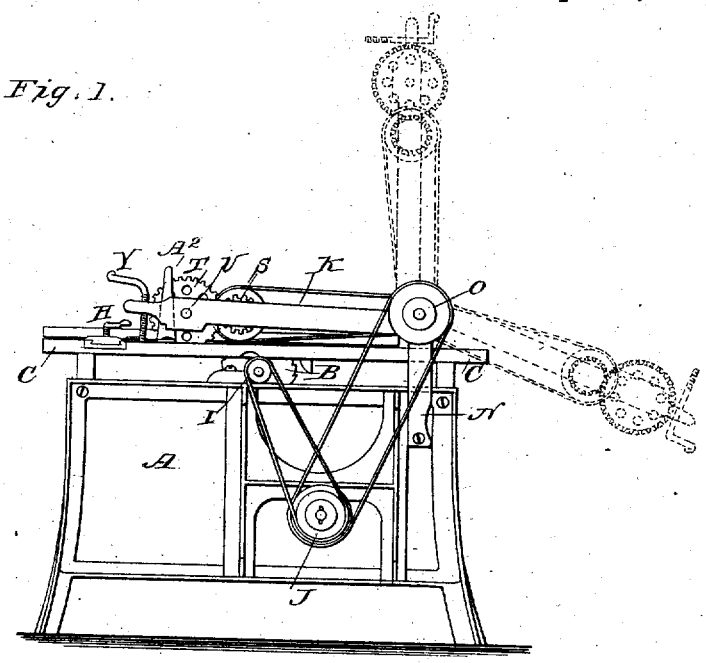
Figure 2:
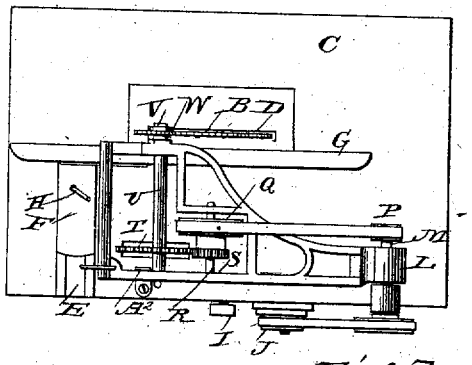
Figure 3:
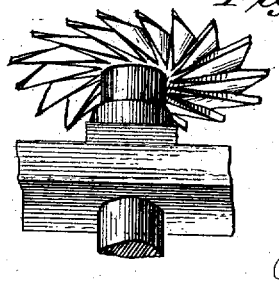

In the drawings hereto annexed, Figure 1 is a side elevation of a machine embodying my improvements. Fig. 2 is a plan view of the same, and Fig. 3 is a detail view, in perspective, of the feed wheel or disk.

The same letters refer to the same parts in all the figures.

A is the stand or frame on which is supported the saw B and the table C, slotted at D to permit the saw to project through it, all of which are of ordinary construction.

In the table C there is formed a cross-dovetail groove, E, in which is held a slide, F, to which is secured the gage-bar G, which lies on the table C parallel with the line of cut of the saw B. By moving the slide F, the bar G may be set at any desired distance from the saw, and can be rigidly fixed in place by a set-screw, H. The saw is driven by a pulley (not shown in the drawings) placed on its shaft and under the table C, and on the outer end of this saw-shaft is placed a pulley, I, which connects by belt with a speed or cone pulley, J, rigged to the side of the frame A.

K is an adjustable frame, which is provided with a box or bearing, L, which is placed on a shaft, M, journaled in the upper end of a standard, N. The lower end of the standard N is fixed rigidly, by any suitable means, to the side of the frame A.

On the outer end of the shaft M is placed a pulley, O, connected by belt to the speed-pulley J. When desired, the belt may be thrown around the pulleys I and O alone; but I prefer to interpose the speed-pulley J, as shown.

On the inner end of the shaft M is placed the pulley P, connected by belt to a pulley, Q, on the shaft R of which is fixed a pinion, S, which meshes with a gear-wheel, T, on the shaft U. The shafts R U are journaled in the side bars of the outer or swinging end of the frame K, and the shaft U is arranged so that its end V projects outward in front of the saw B. On this outer projecting end, V, is fixed a feed-toothed disk, W, which is set immediately over the track in which the saw B will cut. The feed wheel or disk being of a width or thickness about equal to that of the saw, it will be seen that by this arrangement any marks or dents made by the teeth of the said feed-wheel will be cut out by the saw, thus leaving the cut material clear and free from any defacing marks, which are always unsightly, and sometimes require to be obliterated by some finishing process in order to render the material marketable.

The feed-wheel W consists of a notched toothed wheel, the teeth X of which are beveled on their inner sides from their rear edges downward, forward, and outward, the bevel extending from point to base of the tooth, as at Z, so as to form an edge at the inner side of the front of the teeth. By this construction, in case the plank to be sawed should be slightly too narrow to be engaged by the ends of the feed-teeth, the sharp sides of the latter will engage and feed it without difficulty.

The outer or swinging end of the frame K is provided with a set-screw, Y, the lower end of which bears on the table C, and by it the end of frame K may be set higher or lower, to adapt it to planks of different thicknesses, or to give a stronger or weaker bite to the feed-wheel.

$A^2$ is a guide fixed to the side of the table, and arranged to so engage the frame K as to cause the latter to move in a vertical line when raised, and prevent it from swinging laterally. Said frame thus serves to keep the feed-wheel steadily and securely in a true line with the saw. The end of the frame K may be raised to any desired height, or it may be turned entirely off the table, as indicated in Fig. 1.

By my improved feed mechanism the plank is held steadily to the table and fed regularly and evenly to the saw. The feed-wheel being arranged, as shown, in front of and in a direct line with the saw, the kerf will include all marks or dents left by the said feed-wheel, as stated, and the cut material will be clear and free from defacing-marks.

The feed-wheel might be arranged in a vertically-sliding frame in lieu of the herein-described swinging one; or it may be otherwise rigged so as to be properly adjustable.

The invention may also be applied to gang-saws, by arranging a feed-wheel in front of and in a line with each of the saws, without departing from the spirit of my invention, which consists, essentially, in the arrangement of a feed-wheel in front of and in a line with the saw, so that any marks made by the said feed-wheel in the lumber shall be included in the kerf.

A circular sawing machine has been used prior to my invention, in which the material to be sawed is placed back of the saw, so that the teeth of the saw are made to cut upwardly instead of down. In this construction the teeth tend to lift the material up from the table; but this is prevented by the feed mechanism, which consists of a plain toothed wheel fixed above and in rear of the saw, on a transverse shaft journaled in the arms of a swinging frame hinged to the saw-table, and operated automatically to feed the material to the saw. Its teeth engage the material, and as the feed-wheel is in line with the saw any indentations made in the upper face of the material by the teeth of the feed-wheel are removed by the formation of the saw-kerf. This construction is not claimed herein.

I claim as my invention and desire to secure by Letters Patent of the United States—

1. In feed mechanism for circular sawing machines, the feed-wheel consisting of the ratchet-toothed wheel W, having its teeth X beveled on their inner sides from their rear edges downward, forward, and outward, the bevel extending from the point to the base of the tooth, as at Z, so as to form an edge at the inner side of the front of the teeth, and mechanism for operating the same, whereby, should the material to be sawed be too narrow to be engaged by the ends of the teeth, the sharp edges formed by the inner bevels will engage the edge of the material and feed it forward, the tooth-marks being obliterated by the saw-kerf, substantially as specified.

2. In feed mechanism for circular sawing machines, the combination, with the feed-wheel consisting of the ratchet-toothed wheel W, mounted on the transverse shaft V in the hinged frame, and having the inner sides of its teeth X beveled from their rear edges downward, forward, and outward from point to base of the tooth, as at Z, to form an edge at the inner side of the front of the teeth, of the set-screw Y in the frame K, and the guide $A^2$, fixed on the table, and arranged to prevent the lateral movement of the frame K, and mechanism for operating the feed-wheel in connection with the saw, substantially as specified.

In testimony whereof I affix my signature in presence of two witnesses.

JOSEPH H. HERMANCE.

Witnesses:
D. J. LATTIMORE,
JULIUS HAGEMANN.